United States Patent [19]

Francis et al.

[11] Patent Number: 5,192,246
[45] Date of Patent: Mar. 9, 1993

[54] ROTOR ASSEMBLY FOR A COMBINE

[75] Inventors: Robert L. Francis, Moline, Ill.; James W. Minnihan, Racine, Wis.

[73] Assignee: Case Corporation, Racine, Wis.

[21] Appl. No.: 795,930

[22] Filed: Nov. 15, 1991

[51] Int. Cl.⁵ ............................................. A01F 12/20
[52] U.S. Cl. ...................................... 460/72; 460/110; 460/122
[58] Field of Search .................... 460/122, 121, 71, 72, 460/79, 109, 110

[56] References Cited

U.S. PATENT DOCUMENTS

| | | | |
|---|---|---|---|
| 1,571,128 | 1/1926 | Lucas . | |
| 2,349,380 | 5/1944 | Rietz . | |
| 2,361,633 | 10/1944 | Jones . | |
| 3,079,924 | 3/1963 | Dietrich . | |
| 3,664,100 | 5/1972 | Rowland-Hill | 56/14.6 |
| 4,178,943 | 12/1979 | West | 56/14.6 |
| 4,266,560 | 5/1981 | Powell et al. | 56/14.6 |
| 4,505,279 | 3/1985 | Campbell et al. | 460/71 |
| 4,889,517 | 12/1989 | Strong et al. | 460/71 X |
| 4,946,419 | 8/1990 | Cromheecke et al. | 460/122 X |
| 4,986,794 | 1/1991 | Ricketts | 460/71 X |
| 5,035,675 | 7/1991 | Dunn et al. | 460/122 X |

FOREIGN PATENT DOCUMENTS 528907 4/1977 Greece .
650551 3/1979 Greece .

Primary Examiner—Terry Lee Melius
Attorney, Agent, or Firm—Dressler, Goldsmith, Shore, Sutker & Milnamow, Ltd.

[57] ABSTRACT

A combine with a rotor assembly having an impeller at a forward end and a cylindrical drum axially extending from the impeller. The rotor assembly is provided with a series of thresher elements secured about the circumference of the rotor in generally helical arrays and is provided with a plurality of linearly extended thresher elements each having a smooth outer material engaging surface and which are secured about that end of the drum adjacent the impeller. When the rotor assembly is operated, the plurality of linearly extended thresher elements form a paddle like mechanism which extends to a forward end of the rotor assembly to offer enhanced control over the abundance of material being threshed at a forward end of the rotor assembly while simultaneously minimizing damage to the crop thereby maximizing the farmer's profit.

4 Claims, 3 Drawing Sheets

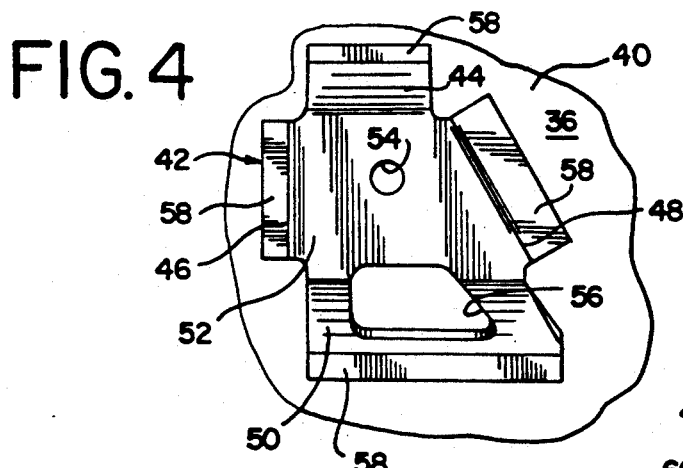
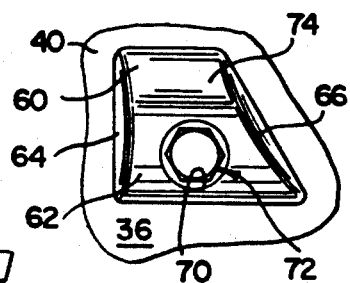
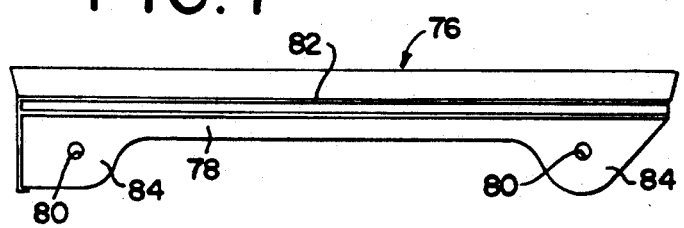
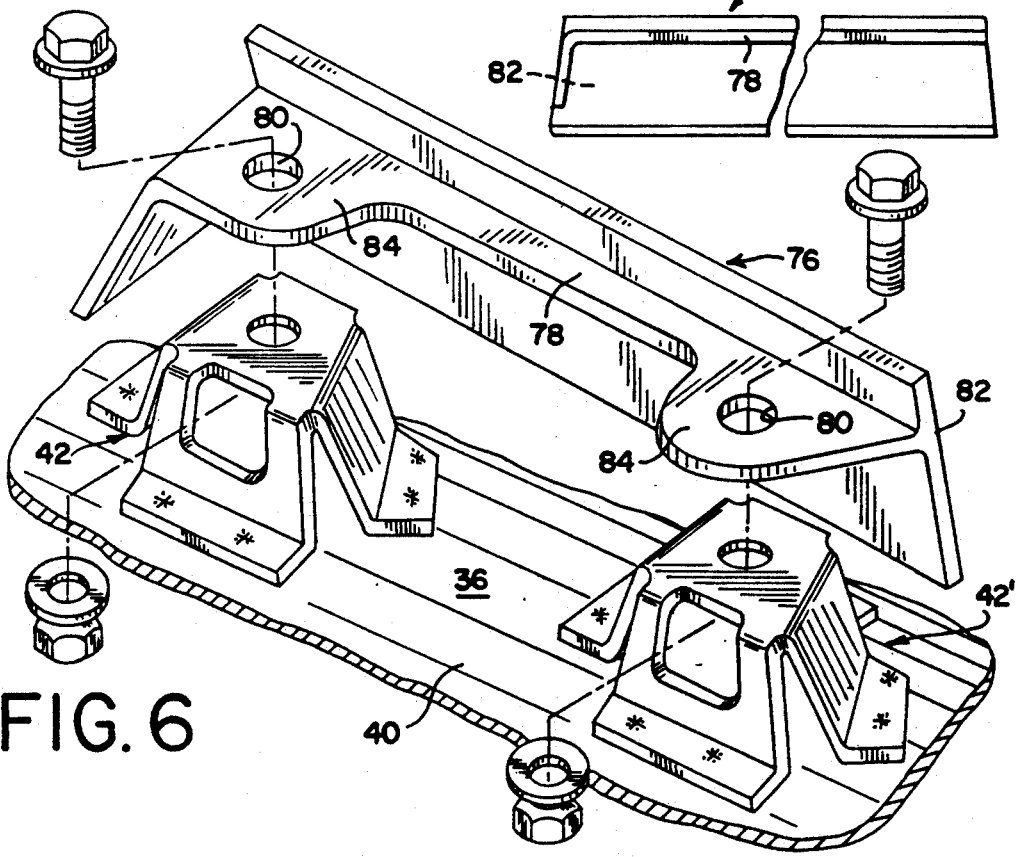

ROTOR ASSEMBLY FOR A COMBINE

FIELD OF THE INVENTION

The present invention generally relates to agricultural combines and, more particularly, to a rotor assembly for a combine.

BACKGROUND OF THE INVENTION

Conventional agricultural combines include a header assembly for severing and collecting crop materials as the combine is driven through a field and a feeder mechanism for advancing and elevating the crop materials to a threshing area on the combine. In the threshing area of the combine, crop material is threshed as it passes between a rotor assembly and a stationary generally cylindrical housing.

The rotor assembly of the combine includes an elongated cylindrical drum or rotor mounted for rotation about a fixed axis. A plurality of thresher elements are fixed to an outer wall of the rotor. The thresher elements impact with the materials and act in combination with the cylindrical housing in separating edible grain or seed from the material other than grain or seed. Various cleaning systems further facilitate the separation of materials.

In rotary threshing, different rotor assembly configurations have been customarily used to harvest different crops. For example, when small grain, corn, and soy beans are harvested, a rotor assembly is typically configured with helical arrays of thresher elements at a forward end of the rotor and linear arrays of thresher elements extending rearwardly from the helical arrays. Harvesting of rice, edible beans, and damp wheat crops normally requires a different rotor assembly configuration. When the configuration of the rotor assembly is mismatched to the particular crop material being harvested, an inefficient waste of materials, frequent jamming of the rotor, and extended downtime for the combine can result.

At a collection station, farmers are paid a premium price for crop material having a relatively low damage content by volume. As small a change as 0.1% in crop material damage by volume can greatly affect the price a farmer is paid for his crop. Accordingly, there is a need and a desire for a combine capable of harvesting material with a minimum of damage to the harvested materials.

U.S. Pat. No. 5,035,675 to N. C. Dunn, et al. discloses a convertible rotor assembly which has advanced combine harvesting technology. This rotor assembly includes a rotor configured to allow a plurality of thresher elements to be arranged thereabout and longitudinally therealong in various patterns and arrays.

The ability to readily change the thresher element configuration about the circumference of the rotor readily allows a farmer to adapt the combine to the particular material being harvested thereby facilitating the threshing process and reducing grain damage. Thus, not only is the combine more efficient but a reduction in grain damage allows the farmer to realize a premium price for his crop thereby maximizing his profits.

During a harvest, a forward end o the rotor assembly receives a greater amount of unthreshed crop material than does a more rearward section of the rotor assembly. Thus, there is a need and a desire to configure the thresher elements in a pattern which will advantageously handle the abundance of material at a forward end of the rotor assembly while simultaneously providing an efficient threshing action thereto.

SUMMARY OF THE INVENTION

In view of the above, and in accordance with the present invention, there is provided a rotor assembly for a combine. The rotor assembly has an impeller section and a generally cylindrical drum axially extending from the impeller section. Thresher elements having a smooth outer material engaging surface are releasably secured about the periphery of the drum. A plurality of linearly extended thresher elements each having a smooth outer surface are secured about that end of the drum adjacent the impeller section. When the rotor assembly is operated, the plurality of linearly extended thresher elements form a paddle-like mechanism which extends to a forward end of the drum to offer improved control over the abundance of material being threshed at a forward end of the rotor assembly.

In a preferred form of the invention, the rotor assembly includes a plurality of outwardly extending mounting lugs circumferentially secured about and lengthwise along an outer wall of the drum and which are adapted to have the thresher elements secured thereto. The majority of the lugs form arrays of helical rows extending about the outer wall of the drum to enable the thresher elements to be individually connected thereto to form various orientations to maximize threshing efficiency and separating action. A plurality of the lugs circumferentially secured about that end of the drum adjacent the impeller section are longitudinally aligned relative to each other. The linearly extended thresher elements are connected to those longitudinally aligned mounting lugs at a forward end of the drum to extend generally parallel to the rotational axis of and about the drum. The linearly extended thresher elements form a paddle-like configuration at a forward end of the drum.

The rotor assembly configured in accordance with the present invention operates in combination with an elongated cylindrical housing to define a forwardly disposed first or concave threshing area and a second or grate threshing area on the rotor assembly. The first and second threshing areas extend lengthwise of the rotor assembly and are arranged adjacent to each other. The thresher elements on the rotor assembly extend into an annular space between the housing and the rotor assembly and through which crop material moves in a mat-like formation. The linearly extended thresher elements preferably extend lengthwise on the drum and extend into at least the forward threshing area of the rotor assembly.

A plurality of helical transport vanes are secured to the housing and extend into the annular space between the rotor and the housing assembly. As the material is thrown outwardly by the paddle-like formation of linearly extended thresher elements, the helical vanes advance the crop material axially rearward toward a discharge end of the combine.

In a preferred form of the invention, the rotor assembly further includes connectors for releasably securing the thresher elements to the mounting lugs whereby the thresher elements can be interchanged about the mounting lugs on the outer wall of the rotor by merely releasing the connectors and replacing or shifting the thresher elements to different locations about the circumference of the drum. The connectors preferably include at least one paired nut and bolt for releasably securing a threshing element to a mounting lug.

The paddle-like formation of thresher elements propel crop material outwardly away from the rotor to impart an aggressive action thereto thereby maintaining a relatively thin mat-like formation of crop material. Thinning the mat-like layer of material allows grain and seed to readily separate or escape from other materials being threshed. As will be appreciated, allowing the edible material to readily separate from other harvested materials lessens the amount of time that the seeds are in the threshing are and thus reduces the likelihood of damage to the seeds. The smooth outer surface configuration on both the linearly extended and other thresher elements also reduces the likelihood of damage to the seeds. A reduction in damaged material warrants a higher price for the farmer at the collection station.

Numerous other features and advantages of the present invention will become readily apparent from the following detailed description, the accompanying drawings, and the appended claims.

BRIEF DESCRIPTION OF THE DRAWINGS

FIG. 4 is a top plan view of a thresher element mounting lug; and

FIG. 5 is a top plan view of one form of thresher element mounted to the rotor assembly shown in FIG. 2;

FIG. 6 is an enlarged, exploded perspective view of another form of thresher element arranged at one end of the rotor assembly;

FIG. 7 is a top plan view of the thresher element shown in FIG. 6; and

FIG. 8 is a fragmentary front elevational view of the thresher element shown in FIG. 7.

DETAILED DESCRIPTION OF THE PRESENT INVENTION

Figure 1:
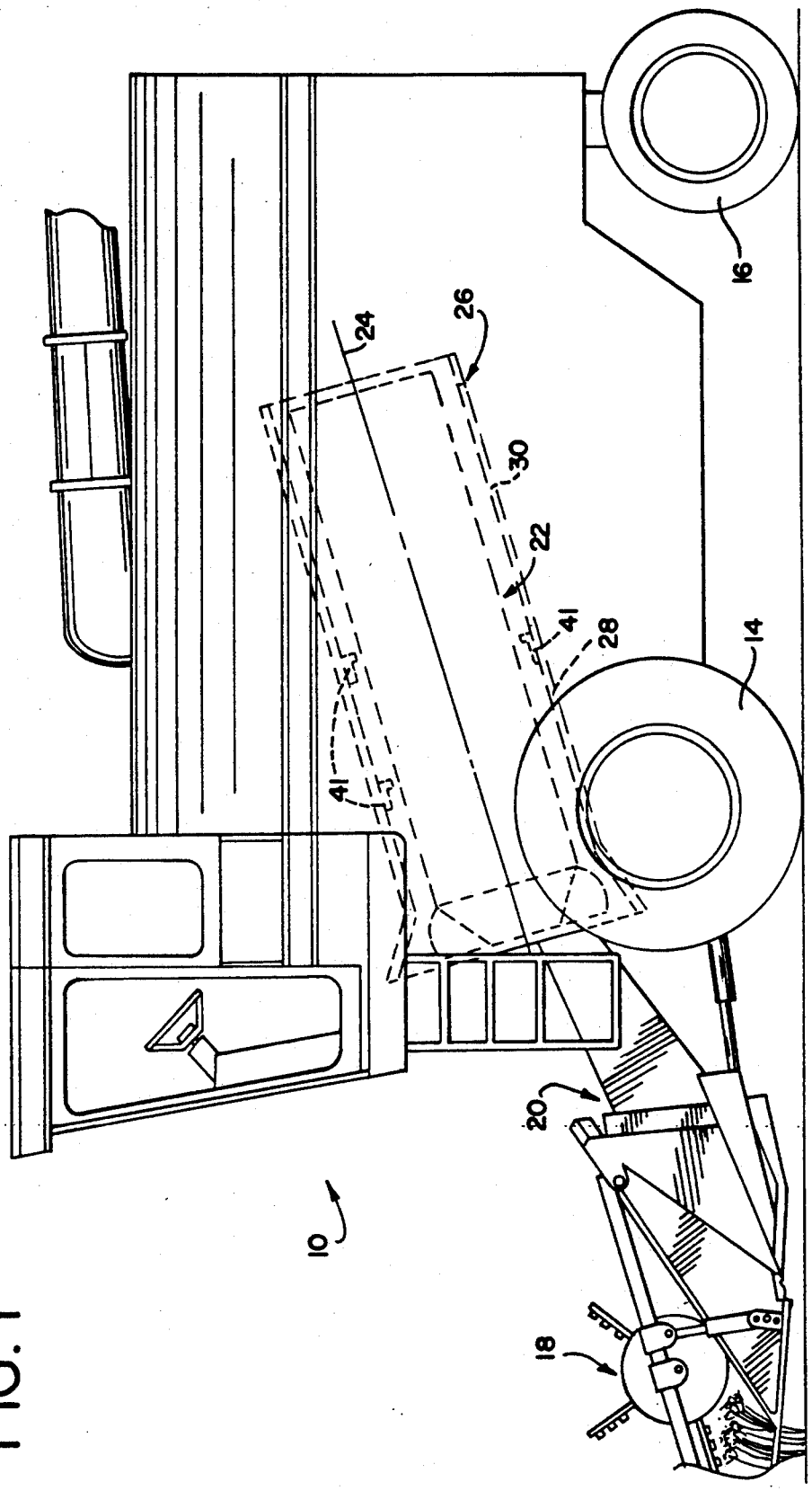
FIG. 1 is a diagrammatic view of an agricultural combine illustrating the general location of a rotor assembly therein.

While the present invention is susceptible to embodiment in various forms, there is shown in the drawings a presently preferred embodiment hereinafter described, with the understanding that the present disclosure is to be considered an exemplification and is not intended to limit the invention to the specific embodiment illustrated.

Referring now to the drawings, wherein like reference numerals indicate like parts throughout the several views, there is shown a self-propelled combine 10 with a fore-and-aft extending frame 12 supported for movement over a field by a front pair of drive wheels 14 and a rear pair of steering wheels 16. At a forward end, combine 10 has a conventional head assembly 18 for severing and gathering crop materials, and a suitable feeder mechanism 20 for elevating and rearwardly advancing the crop materials toward a threshing area on the combine.

The threshing area of the combine is defined by a driven rotor assembly 22 mounted for rotation about an elongated axis 24 and within a stationary apertured cylindrical housing 26. Housing 26 is provided with an apertured concave portion 28 defining a first lengthwise extending forward threshing area for the rotor assembly and an apertured grate section 30 defining a second lengthwise extending threshing area for the rotor assembly.

Figure 2:
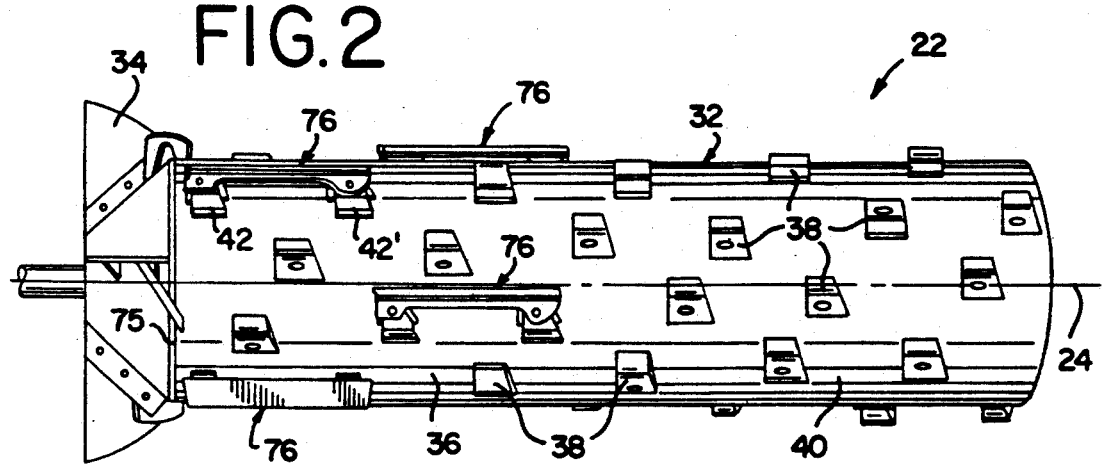
FIG. 2 is an elevational view of a rotor assembly removed from the combine and embodying principles of the present invention.
Figure 3:
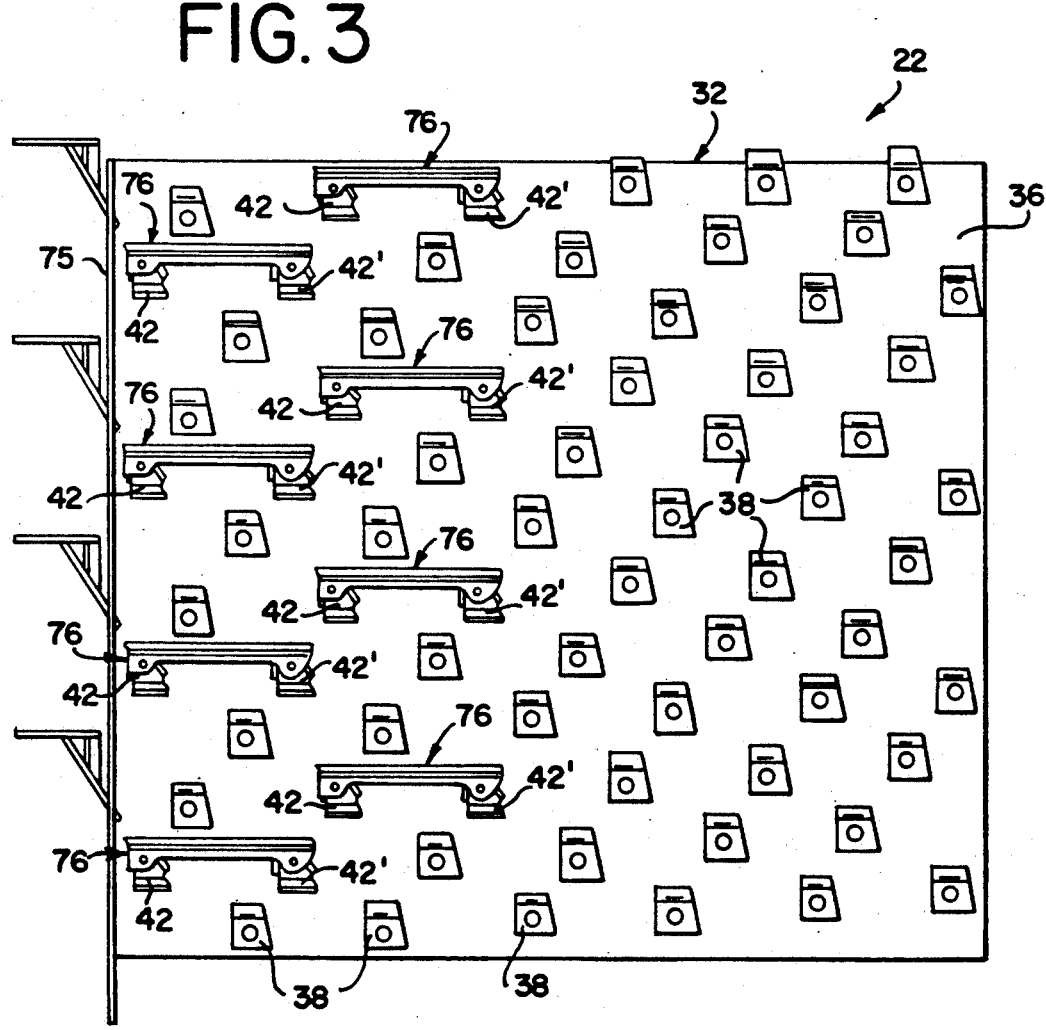
FIG. 3 is a plan, developed view of a rotor assembly embodying principles of the present invention.

Turning to FIG. 2, rotor assembly 22 is comprised of an elongated rotor 32 having a conventional impeller 34 at a forward end and an elongated generally cylindrical drum 36 axially extending from the impeller. As shown in FIGS. 2 and 3, a plurality of thresher elements 38 are arranged about and longitudinally along the drum 36. The thresher elements 38 are adapted to cooperate with housing 26 (FIG. 1) in threshing crop material harvested by the combine. The drum 36 of rotor 32 includes a generally cylindrical outer wall 40. The outer wall 40 of drum 36 and an inner surface of housing 26 (FIG. 1) define a generally annular space therebetween and through which crop material circulates and advances rearwardly toward an outlet end of the combine. A plurality of helically shaped vanes 41 carried on housing 26 (FIG. 1) extend into the annular space between housing 26 and rotor 32 to facilitate rearward advancement of crop materials toward the a discharge end of the combine.

A plurality of thresher element mounting lugs 42 are rigidly secured, as by welding, about and lengthwise along the outer wall 40 of drum 36. As shown in FIG. 4, each mounting lug comprises an open, frusto, pyramidal structure having a front or leading wall 44, side walls 46 and 48, and a rear or trailing wall 50. All the walls taper upwardly toward a top wall 52 which is preferably formed integrally with the other walls. The top wall 52 is provided with a connector-receiving opening or hole 54, and the rear wall 50 is formed with access opening 56 dimensioned to permit entry into the interior of a respective lug 42 by a tool or finger for purposes which would become apparent as the description proceeds. Each of the walls 44, 46, 48, and 50 comprises a bottom flange 58 which is rigidly secured to the outer wall 40 of drum 36 by suitable welding.

As best illustrated in FIG. 3, the majority of the mounting lugs are secured to the outer wall 40 of the drum 36 such that the thresher elements secured thereto form arrays of helical rows extending over the entire outer surface of the rotor. The threshing elements are selectively and individually connected to the mounting lugs to form various orientations thereby maximizing threshing efficiency and separating action during the harvesting process.

Each threshing element is formed from a suitable metal or metal alloy. As shown in FIG. 5, one form of thresher element is preferably configured in accordance with the teachings of our co-assigned and co-pending patent application filed Sep. 9, 1991 and entitled "Thresher Elements for a Combine", the full teachings of which are incorporated herein by reference. Suffice it to say, the majority of thresher elements are configured with first and second portions 60 and 62, respectively, which are preferably joined to each other to form a generally inverted L-shaped structure. When mounted on the rotor 32, the first portion 60 of each thresher element extends away from the outer wall 40 of the rotor drum 36 and the second portion 62 extends thereabout to impact with the crop material during the threshing process. In the illustrated embodiment, each thresher element further includes side walls 64 and 66. Side walls 64 and 66 depend from the second portion 62 of the thresher element. Preferably, the side walls 64 and 66 are likewise joined to the first portion 60 of the thresher element to form a structure which opens toward the rear side thereof for purposes to be described in detail hereinafter.

The second portion of the thresher element includes a recessed connector opening 70. Suitable connector means releasably join the thresher element to a respective mounting lug. The connector means 72 preferably comprises a suitable bolt and nut combination. As will be appreciated, when the thresher element is positioned over a respective mounting lug 42, opening 70 generally aligns with hole 54 (FIG. 4) in a manner allowing the thresher element to be releasably secured to the rotor 32.

Each thresher element includes a smooth outer material engaging surface 74 extending along and thereabout. The smooth outer material engaging surface 74 allows the thresher elements to impact with the crop material while inhibiting damage thereto during the threshing process. Notably, the recessed opening 70 in the thresher element allows the connector means 72 to remain substantially below the smooth outer material engaging surface 74 of the thresher element thus inhibiting the connector means 72 from damaging crop material during the threshing process.

According to the present invention, the rotor 32 is designed with several mounting lug sets circumferentially secured about that end of the drum 36 adjacent to the impeller 34 for allowing a different form of thresher element to be secured to a forward end of the rotor 32. As shown in FIGS. 3 and 6, each mounting lug set includes at least two mounting lugs 42 and 42', respectively. The mounting lugs in each set are substantially similar to the mounting lug structure discussed above. Unlike the other mounting lugs on the rotor 32, however, the first and second mounting lugs 42 and 42' of each mounting lug set are longitudinally aligned relative to each other. Notably, the foremost mounting lug 42 in each set is secured proximate to a forward end 75 of the drum 36 and adjacent the impeller 34. Other mounting lug sets comprised of at least two longitudinally aligned mounting lugs 42 and 42' can be provided on the drum 36 rearwardly of those mounting lug sets arranged at a forward end of the rotor 32.

The longitudinal alignment between the mounting lugs of each mounting lug set permits a linearly extended thresher element 76 to be secured to the rotor 32 such that the thresher element extends parallel to the rotational axis 24 of the rotor assembly 22. As shown in FIGS. 6, 7 and 8 each linearly extended thresher element 76 includes an elongated top wall 78 formed with a pair of connective receiver openings 80, a smooth front wall 82, and a pair of end segments 84 adapted to fit over a pair of axially aligned mounting lugs 42 and 42'. As with the other thresher elements, each linearly elongated thresher element 76 may be releasably connected in contour-accommodating relationship to the respective mounting lugs 42 and 42' with suitable releasable connector means 72 such as that discussed above. Notably, the opening 56 in the lugs 42 and 42' provide access for a suitable tool for connecting or removal of such connectors.

As shown in FIGS. 2 and 3, the foremost elongated threshing elements 76 longitudinally extend from the forward edge 75 of the rotor (FIG. 1). Other linear thresher elements 76 may be provided rearwardly thereof depending upon the particular harvesting conditions and the desired result.

The linear threshing elements 76 arranged at a forward end of the rotor assembly form a paddle-like arrangement extending about the rotor 32. The paddle-like formation of thresher elements propels crop material outwardly away from the rotor thereby maintaining a relatively thin mat of material at a forward end of the rotor assembly during the threshing process. Propelling the crop material outwardly allows the helical vanes 41 to act on the crop material and move it rearwardly toward a discharge end of the combine.

As will be appreciated, maintaining a relatively thin mat of material while also providing aggressive feeding action during the threshing process readily separates seed and edible grain from other crop materials and other harvested materials. Separation of the seed and edible grain from other crop materials at an early stage in the threshing process minimizes the damage that can be done to the edible materials. The ability to separate seed at an early stage of the threshing process has advantageously provided a lower damage content for the harvested materials. Moreover, providing both the elongated thresher elements and other thresher elements with a smooth outer material engaging surface has shown beneficial results in lowering material damage thus providing the farmer a premium price for his crop.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. An axial-flow rotor assembly for a combine comprising an impeller at one end of said rotor assembly and a generally cylindrical drum axially extending from said impeller and having an elongated axis of rotation, said drum having an outer wall with a plurality of outwardly extending mounting lugs circumferentially secured about and lengthwise along the outer wall of the drum and adapted to have thresher elements secured thereto, the majority of said lugs forming arrays of helical rows extending about the outer wall of the drum to enable said thresher elements to be individually connected thereto to form various orientations to maximize threshing efficiency and separating action, and with a plurality of said lugs being circumferentially secured in corresponding mounting sets about that end of the drum adjacent to said impeller, each mounting set of lugs including at least two lugs linearly spaced apart from each other and being longitudinally aligned relative to each other, with a series of said thresher elements having a linearly extended configuration, each linearly extended thresher element having a length which bridges the linear distance separating linearly aligned lugs of a mounting set and a width extending away form said drum and a material engaging area extending between the length and width of the linearly extended thresher element, the material engaging area of each linearly extended thresher element having a continuous and smooth surface, and means for connecting the linearly extended thresher elements to the mounting sets of lugs such that said linearly extended thresher elements extend generally parallel to the rotational axis of and about the drum to provide a paddle-like mechanism which offers improved control over the material being threshed by the rotor assembly.

2. The rotor assembly according to claim 1 wherein said connector means includes at least one paired nut and bolt for releasably securing a thresher element to a mounting lug.

3. An axial-flow rotor assembly mounted for rotation about a longitudinal axis and within an elongated cylindrical housing on a combine, said housing having an apertured concave portion defining a first lengthwise threshing area for the rotor assembly and an apertured grate portion defining a second lengthwise threshing area for the rotor assembly and which extends lengthwise adjacent to the first threshing area, said rotor assembly having a rotor with a generally cylindrical outer wall, the outer wall of the rotor and an inner annular surface on said housing defining a generally annular space therebetween through which crop material moves in a mat-like formation, said rotor having a plurality of outwardly extending mounting lugs circumferentially secured about and lengthwise along the outer wall of the rotor for releasably securing thresher elements thereto, each thresher element having a smooth material engaging surface projecting into the annular space to impact with and thresh crop materials adapted to advance therethrough, the majority of the mounting lugs on and about the rotor forming arrays of helical rows extending about the outer wall to enable said thresher elements to be individually connected thereto to form various orientations thereby maximizing threshing efficiency and separating action, and with a plurality of said lugs being arranged circumferentially in corresponding mounting sets about the first threshing area of the rotor assembly, each mounting set of lugs including at least two lugs linearly spaced apart from each other and being longitudinally aligned relative to each other, and wherein said rotor assembly further includes thresher elements which project into the annular space to impact with and thresh crop materials adapted to advance therethrough, the majority of said thresher elements being releasably secured to the mounting lugs arranged in helical rows to form various orientations of threshing elements thereby maximizing threshing efficiency and separating action, and with a plurality of thresher elements having a linearly extended configuration being connected to the mounting sets, each linearly extended thresher element having a length which bridges the linear distance separating linearly aligned mounting lugs of a mounting set and a width extending away from the outer wall of the rotor with a material engaging area extending therebetween, the material engaging area of each linearly extended thresher element having a smooth and continuous surface, and means for connecting the linearly extended thresher elements to the sets of mounting lugs so that a paddle-like arrangement of thresher elements is formed about a forward end of the rotor to propel crop material outwardly from the rotor thereby maintaining a relatively thin mat-like formation of crop material which allows seed to readily separate from other crop material during the threshing process for inhibiting damage to crop materials during threshing.

4. The rotor assembly according to claim 3 further including a plurality of vanes fixed to said housing and extending into said annular space to propel crop material axially rearward toward a discharge end of the combine.

* * * * *